June 21, 1955     C. V. KRICHTON     2,711,474
DEEP FAT FRYER
Filed Oct. 14, 1953     2 Sheets-Sheet 1
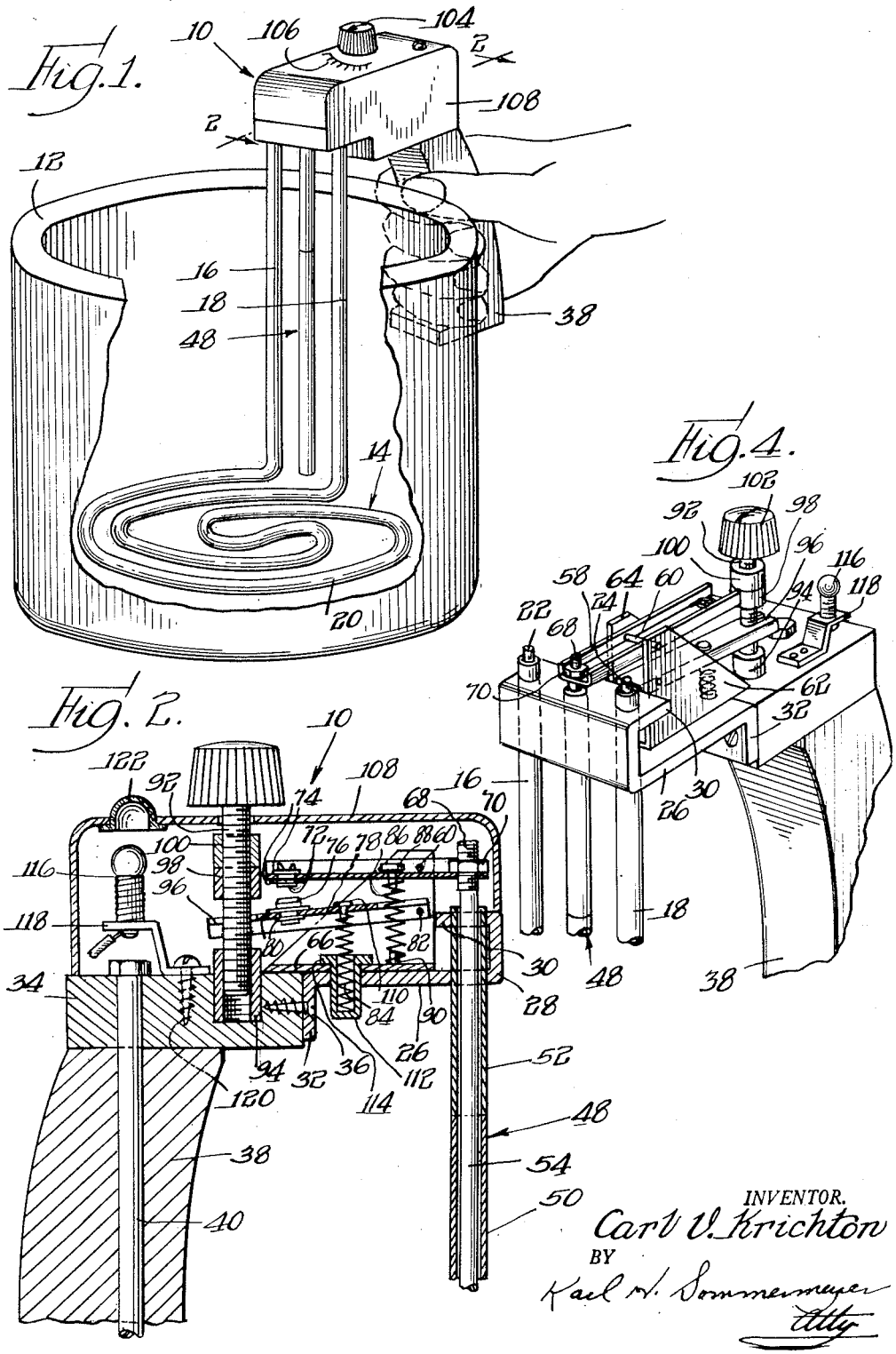
INVENTOR.
Carl V. Krichton
BY
Karl H. Sommermeyer
Atty June 21, 1955 C. V. KRICHTON 2,711,474
DEEP FAT FRYER
Filed Oct. 14, 1953 2 Sheets-Sheet 2
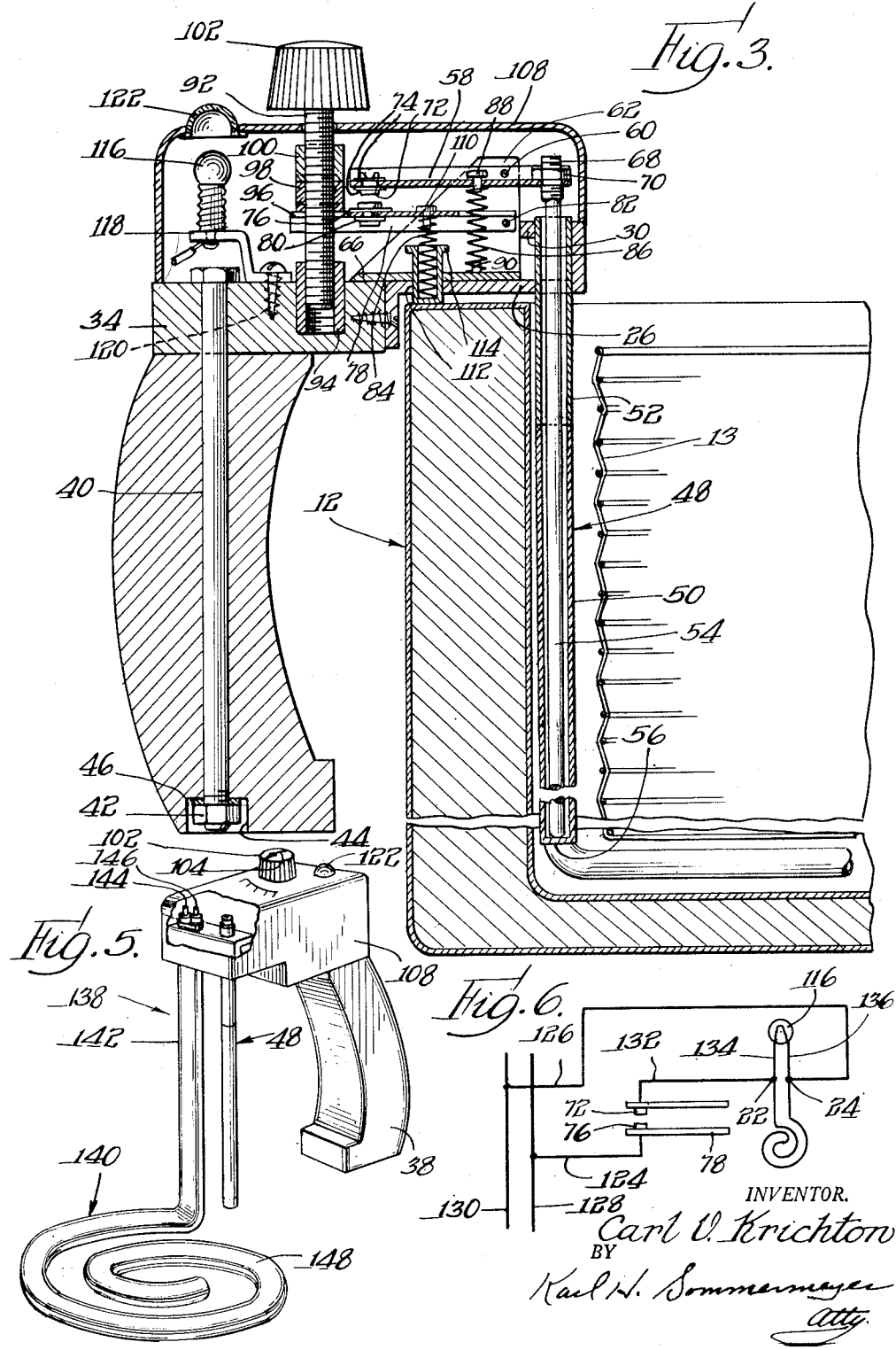
INVENTOR.
Carl V. Krichton
BY
Karl H. Sommermeyer
atty.

United States Patent Office 2,711,474
Patented June 21, 1955

2,711,474

DEEP FAT FRYER

Carl V. Krichton, Geneva, Ill., assignor to McGraw Electric Company, Elgin, Ill., a corporation of Delaware Application October 14, 1953, Serial No. 385,923

11 Claims. (Cl. 219—41)

The present invention relates to a novel heating unit and more particularly to a novel unitary immersion heater adapted to heat a body of liquid in a container as for example a body of liquid in a cooking container such as a deep fat fryer.

An object of the present invention is to provide a novel unitary heater which may be readily and quickly assembled with or removed from a container and which is constructed so that parts thereof immersed in the body of liquid may be readily cleaned.

Another object of the present invention is to provide a novel unitary heater of the above described type which may heat a body of liquid to a predetermined temperature and maintain the predetermined temperature regardless of minor temperature variations adjacent or above the surface of the liquid body.

Still another object of the present invention is to provide a unitary heater of the above described type with simple and relatively economical means for preventing actuation of the heater until it is properly positioned with respect to the liquid container.

Other objects and advantages of the present invention will become apparent from the following description in the accompanying drawings wherein:

Fig. 1 is a perspective view illustrating a novel heater embodying the principles of this invention positioned above a container with which it is adapted to be associated;

Fig. 2 is an enlarged fragmentary cross sectional view taken along line 2—2 in Fig. 1;

Fig. 3 is an enlarged cross sectional view similar to Fig. 2 but showing the novel heater of this invention applied to a container;

Fig. 4 is an enlarged fragmentary perspective view illustrating certain novel features of this invention in greater detail;

Fig. 5 is a perspective view showing a modified form of the novel unitary heater; and Fig. 6 is a diagrammatic view showing the electrical circuit of the unitary heater.

Referring now more specifically to the drawings wherein like parts are designated by the same numerals throughout the various figures, a unitary heater 10 embodying the principles of this invention is shown best in Fig. 1. For the purpose of illustration the heater 10 is shown in the drawings and will be described as associated with a deep fat fryer container 12 adapted to contain a body of liquid such as melted fat and adapted to receive a basket 13 (see Fig. 3) of the usual construction for holding foods and the like to be cooked. As will appear from the description herein below the heater 10 may readily be assembled with or removed from the container 12 and the parts of the heater immersed within the container may be readily cleaned.

As shown best in Figs. 1, 2 and 3 the heater 10 includes a heating element 14 comprising a hollow steel tube bent to provide a pair of generally vertically disposed and rather widely spaced legs 16 and 18 and a spiral portion 20 connecting said legs adjacent their bottom ends and adapted to be disposed along the bottom of container 12. A suitable electric resistance element extends through the heating element tube and the opposite ends of the resistance element extend above the tops of the legs 16 and 18 as at 22 and 24 (see Fig. 4) for connection with suitable electric conduits described below. The upper ends of the legs 16 and 18 extend through apertures in a mounting or base plate 26 and are secured to the mounting plate in any suitable manner. In order to hold the heating element tube rigidly the mounting plate is provided with an upstanding wall 28 and a reversely bent flange 30 which flange also has apertures therein for receiving the upper ends of the legs 16 and 18. The flange 30 is spaced well above the body of the plate 26 and thus the legs 16 and 18 are supported at axially spaced points to provide the desired rigidity. The opposite end of the plate 26 is provided with a depending flange 32 that is engageable with the outer surface of the container 12 when the heating or heater unit is assembled with the container as shown in Fig. 3 in order to prevent the heater from falling into the container.

In order to facilitate assembly and removal of the heater 10 with respect to the container means is provided to enable the operator to handle the heater with ease. This means includes a block 34 secured to the depending flange 32 of the plate 26 by means of a plurality of screws 36. A pistol grip type handle 38 depends from the block and is fastened thereto by means of a bolt 40 extending through aligned apertures in the block and handle and a nut 42 threaded on the lower end of the bolt and disposed within a recess 44 formed in the lower end of the handle. Preferably a lock washer 46 is disposed between the nut 42 and the handle to prevent accidental loosening of the nut.

In accordance with the feature of this invention novel means is provided for controlling the temperature of the liquid bath into which the heating element is immersed and this means includes a thermostat temperature responsive unit 48 depending between and spaced from the legs 16 and 18 of the heating element in the manner shown best in Figs. 1 and 4. The outer surface of the elongated thermostat unit 48 is smooth rounded as are the legs 16 and 18 of the heating element and since these portions of the heater which are immersed within the container are spaced well apart they may be readily cleaned. Preferably the legs 16 and 18 are spaced from the unit 48 a distance substantially at least as great as the smallest diameter of the legs or unit 48 so that such spacing permits easy access between the legs and unit for cleaning purposes. In many instances it is desirable that the heat responsive unit be actuated in accordance with the temperature of the bath adjacent the major or spiral portion of the heating element and be relatively unaffected by variations in temperature adjacent at, or even above the surface of the bath. Thus, in accordance with another feature of this invention the heat responsive unit 48 comprises an outer elongated hollow tube having a lower portion 50 constructed from a material with a relatively high coefficient of expansion such as brass or aluminum and an upper portion 52 constructed from a material having a relatively low coefficient of expansion such as various well known alloy steels. The upper and lower portions may be welded, brazed or otherwise secured together and the uppermost end of the tube portion 52 extends through suitable aligned apertures in the plate 26 and overlying flange 30 and is fixed to the plate in any suitable manner. A rod 54 constructed from a material such as glass having a low coefficient of expansion is disposed within the tube and is supported by the lowermost closed end 56 of the tube portion 50. Since the upper end of the tube is fixed relative to the plate 26 it will be understood that the lower end 56 will move toward and away from the mounting plate 26 upon temperature variations in the bath so that the rod 54 will be raised or lowered in accordance with such temperature variations. Since both the rod 54 and the upper tube portion 52 are substantially unresponsive to temperature changes it is seen that the rod will be raised or lowered substantially only in accordance with temperature changes in the lower portions of the fluid body in the container.

The upper end of the rod 54 is disposed to actuate an electrical switch for controlling energizing of the heating element in accordance with the temperature of the body of liquid in the container. This switch is shown best in Figs. 2, 3 and 4 and includes a switch arm 58 pivotally mounted by means of a pin 60 between upstanding walls 62 and 64 of a bracket 66 fixed to the plate 26 by suitable means, not shown. The rod 54 engages the switch arm 58 through a set screw 68 threaded through one end of the arm and locked in position by a nut 70. An electrical contact 72 is riveted to the opposite end of the switch arm and is electrically insulated therefrom by washers 74 made of mica or any other suitable material. With this structure it is seen that as the rod 54 rises in accordance with a lowering in the temperature of the fluid bath the switch arm 58 is pivoted in a counter clockwise direction as viewed in Figs. 2 and 3 so that the contact 72 is lowered into engagement with a second switch contact 76 to close the circuit and energize the heating element. The contact 76 is riveted to an arm 78 and is insulated therefrom by mica washers 80. The arm 78 is also pivotally mounted between the bracket walls 62 and 64 by means of a pivot pin 82 and the arm 78 is yieldably supported by means of a spring 84. With this structure it is seen that as the contact 72 is lowered the spring 84 may be compressed as the switch arm 78 is forced downwardly so that the contact points may be maintained in engagement for a sufficient length of time to bring the entire liquid bath up to the desired temperature even though the temperature of the liquid body at the extreme lower portion thereof may be slightly above that desired. This feature is especially advantageous during initial heating of the liquid bath since a relatively great amount of time may be required to bring the upper portions of the bath to the proper temperature after the lower portions of the bath have reached that temperature. However, after the bath has once been heated compression of the spring 84 will be slight and the heating intervals will be relatively short. When the switch arm 78 has reached the upper limit of its movement and the liquid bath has been brought to the desired temperature it is of course necessary to break the contact between the points 72 and 76. This is accomplished by means of a spring 86 which acts between the bracket 66 and the switch arm 58 to pivot the switch arm in a clockwise direction as viewed in Figs. 2 and 3 so that the arm 58 always maintains operative engagement with the rod 54. The upper end of the spring 86 is preferably maintained in the desired position by means of a pin 88 forced through an aperture in the arm 58 and the lower end of the spring is maintained in position by similar pin 90 secured to the bracket 66.

In order to give the operator control of the temperature of the liquid body means is provided for adjusting the upper limit of movement of the switch arm 78 and thus the point where the contacts 72 and 76 disengage. This means includes a post 92 threaded into a bushing 94 fixed to the block 34 and passing upwardly through a suitable recess 96 formed in the end of the switch arm 78. Adjustable abutment means in the form of a pair of jam nuts 98 and 100 are mounted on the threaded post 92 for limiting upward movement of the switch arm 78. A knob 102 is fixed on the upper end of the threaded post for turning the post and thus adjusting the position of the nuts 98 and 100 and the upper limit of movement of the switch arm 78. A visual indication of the temperature to which the heater is adjusted may be provided by a pointer 104 on the knob 102 which pointer is adapted to cooperate with a calibrated scale 106 on a housing 108. The housing 108 may be formed in any well known manner and is secured to the plate 26 and block 34 by suitable means, not shown.

Another important feature of this invention lies in the provision of means for substantially eliminating all possibility of accidentally energizing the heating element and more particularly for preventing closing of the contact 72 and 76 until the heater has been positioned on the container. In accordance with this invention this means is extremely simple and yet highly efficient and includes the above described spring 84 for raising the switch arm 78. The upper end of the spring 84 is retained in associated relationship with the switch arm by means of a pin 110 and the lower end of the spring is housed within a hollow push button 112. The push button extends slidably through suitable aligned apertures in the plate 26 and bracket 66 and is provided with an annular flange 114 at its upper end to limit downward movement thereof. Thus, when the heater is disassembled from the container as shown in Fig. 2 the push button 112 drops to its lowermost position so that the switch arm 78 also drops to a position where contact between the point 72 and 76 is impossible. With this structure it is seen that the simple switch of this invention not only acts to control the heating element in accordance with the temperature of the liquid bath but also acts as a safety switch to prevent energizing of the heating element until the heater unit 10 has been associated with the container as shown in Fig. 3 so that the push button 112 engages the upper edge of the container and is moved to its raised position.

As another safety precaution the heater unit 10 is provided with a pilot light 116 connected in parallel with the heating element so that the light is illuminated whenever the heating element is energized. The light 116 may be conveniently mounted in a bracket 118 secured to the block 34 by screw 120 and a glass or plastic window 122 is provided in the top of the housing 108 so that the operator may readily see whether or not the light is energized.

In Fig. 6 a simple electrical circuit for the heater 10 is diagrammatically illustrated. This circuit includes electrical conduits 124 and 126 which are adapted to be connected to power lines 128 and 130 respectively. The electrical conductor 124 is connected with the switch contact point 76 and the conductor 126 is connected with the end 24 of the heater resistance element. An electrical conductor 132 is provided for connecting the contact point 72 and the end 22 of the heater resistance element to complete the circuit. The pilot light 116 is connected across the ends 22 and 24 of the resistance element by wires 134 and 136.

In Fig. 5 there is illustrated a heater unit 138 which is substantially identical to the above described heater unit 10 as indicated by the same numerals applied to corresponding parts. This embodiment differs from the heater 10 only in that a slightly modified heating element 140 has been provided in place of the above described heating element 14. The heating element 140 differs from the above described heating element 14 in that only one upstanding leg 142 has been provided in the hollow arm or tube and the electrical resistance element is doubled throughout the tube so that ends 144 and 146 thereof are disposed adjacent each other in the manner illustrated. As is clearly illustrated this structure greatly simplifies the formation of the spiral portion 148 of the arm or tube and in addition further simplifies cleaning of the heating element and the heat responsive unit 48 of the thermostat.

From the above description it is seen that the present invention has provided a novel heater unit which may be readily assembled with or removed from a liquid container and which is constructed so that the portions thereof adapted to be immersed in the liquid may be readily cleaned. In addition it is seen that the present invention has provided a novel heater unit wherein the temperature of the liquid body may be closely and accurately controlled substantially without regard to temperature variations adjacent at or above the surface of the liquid body. This is particularly advantageous when the liquid is melted fat or the like which has a tendency to bubble or foam up around the upper portion of the thermostat heat responsive element. Furthermore, it is seen that the present invention has provided a novel heater with a switch structure which is capable of not only controlling the heating element in an efficient manner in accordance with the temperature of the liquid bath but also of preventing energizing of the heating element until the heater has been properly assembled with the container.

While the preferred embodiments of the present invention have been shown and described herein it is obvious that many structural details may be changed without departing from the spirit and scope of the appended claims.

The invention is claimed as follows:

1. A unitary immersion heater structure comprising base means adapted to be removably associated with an edge of a container wall, a heating element including an elongated tubular member and an electrical resistance element extending through said tubular member, said tubular member having a leg portion fixed to said base means and adapted to extend along said wall of the container, and thermostat means mounted on said base means for controlling said electrical resistance element, said thermostat means having a tubular heat responsive unit extending along said leg of said tubular member and spaced sufficiently from said leg to provide easy access between said heat responsive unit and said leg whereby to facilitate cleaning of the heat responsive unit and said tubular member, and said heat responsive unit and said tubular member being interconnected only by said base means whereby the space there between is unobstructed so as to further promote easy cleaning.

2. A unitary immersion heater as defined in claim 1 wherein said base means includes a plate member adapted to hang on an upwardly facing edge of a container, said plate member comprising a body portion and a reversely bent flange generally parallel to and spaced from said body portion, and said body portion and flange having aligned apertures therein for receiving upper end portions of said heat responsive unit and said leg of the tubular member thereby providing two-point support for the heat responsive unit and said leg for rigidifying the same.

3. A unitary immersion heater as defined in claim 1 wherein said elongated tubular member includes a second leg adapted to extend along the wall of a container and secured to said base means, said second leg being spaced from said first mentioned leg and said heat responsive unit a distance sufficient to permit ready cleaning thereof.

4. A unitary immersion heater comprising base means adapted to be removably associated with an upwardly facing edge of a liquid container, heating means having an elongated tubular member with a leg secured to said base means and adapted to extend along a wall of said container and an electrical resistance element extending through said tubular member, thermostat means mounted on said base means for controlling said heating element, said thermostat means including a heat responsive unit secured to said base means and adapted to extend along said wall of a container, said heat responsive unit comprising an elongated tubular shell, said tubular shell having a lower portion constructed from a material with a relatively high coefficient of thermal expansion and an upper portion constructed from a material with a relatively low coefficient of thermal expansion, an elongated member disposed within said tubular shell, and means operatively connecting said elongated member and the bottom end of said tubular shell, which elongated member is constructed from a material with a relatively low coefficient of thermal expansion, so that the elongated member is moved in accordance with any expansion or contraction of said lower portion of the tubular shell to actuate heating means controlling switch means.

5. A unitary immersion heater comprising base means adapted to be removably associated with an upwardly facing edge of a liquid container, heating means secured to said base means and adapted to extend into said container, thermostat means mounted on said base means and including a switch for controlling said heating means, and means for preventing closing of said switch until said base means has been associated with said container.

6. A unitary immersion heater comprising base means adapted to be removably associated with an upwardly facing edge of a liquid container, heating means secured to said base means and adapted to extend into said container, and thermostat means mounted on said base means and including a switch means for controlling said heating means, said switch means includes a pair of movably mounted arm members, one of said arm members being operatively connected with a heat responsive unit of said thermostat means, and means for rendering said switch means inoperative until said base means has been associated with said container, said last named means including push button means slidably mounted on said base means and operatively connected with the other of said arms so that upon engagement of the push button means with the container the arm is moved to an operative position and upon disengagement of the push button means from the container the arm may move to an inoperative position.

7. A unitary immersion heater comprising base means adapted to be removably associated with an upwardly facing edge of a liquid container, heating means secured to said base means and adapted to extend into said container, and thermostat means mounted on said base means and including a switch means for controlling said heating means, said switch means includes a pair of movably mounted arms, one of said arms being operatively connected with a heat responsive unit of the thermostat means, and means including spring means for resiliently holding the other of said arms in an operative position, said heat responsive unit being operable when the temperature in said container is too low to move said one arm into engagement with the other of said arms to energize said heating means and further to move both of said arms against the action of said spring means so that contact between said arms may be maintained for a sufficient period of time to raise the temperature within said container to the desired level.

8. A unitary immersion heater including a base member adapted removably to rest on an upwardly facing edge of a liquid container, said base means having a body portion and another portion spaced therefrom, heating means including an elongated tubular shield with a leg adapted to extend along a wall of said container and projecting into aligned apertures in said spaced portions of said base means so that the leg is rigidly supported at spaced areas, an electrical resistance element extending through said shield, thermostat means mounted on said base member and including an elongated tubular heat responsive unit extending generally along said leg and projecting into and secured within other aligned recesses in said spaced base member portions, said heat responsive unit and said leg being separated from each other by an unobstructed space sufficiently wide to permit ready cleaning thereof, switch means on said base member and operated by said heat responsive unit for controlling said heating means, means for rendering said switch means inoperative when said heater is removed from the container to prevent accidental energizing of said heating means, and handle means secured to said base member to facilitate assembly of the heater with and removal of the heater from a container.

9. A unitary immersion heater including a base member adapted removably to rest on an upwardly facing edge of a container, heating means including an elongated tubular shield with a leg having one end portion fixed to said base member and adapted to extend along a wall of said container, an electrical resistance element extending through said shield, thermostat means mounted on said base member and including an elongated tubular heat responsive unit extending generally along said leg and separated from said leg by an unobstructed space sufficiently wide to permit ready cleaning of said leg and said heat responsive unit, switch means on said base member and operated by said heat responsive unit for controlling said heating means, said switch means including a pair of pivotally mounted arms, one of said arms being operatively connected with and actuated by said heat responsive unit, resilient means for biasing the other of said arms to an operative position, and means slidably mounted on said base member and associated with said resilient means and operable to render said resilient means effective when the slidable means engages the container and further operable to render said resilient means ineffective when the slidable means is disengaged from a container.

10. A unitary immersion heater including a base member adapted removably to rest on an upwardly facing edge of a liquid container, heating means including an elongated tubular shield with a leg adapted to extend along a wall of said container and having an end portion secured to said base member, an electrical resistance element extending through said shield, and thermostat means mounted on said base member and including an elongated tubular heat responsive unit extending generally along said leg and secured to said base member and separated from said leg by an unobstructed space sufficiently wide to permit ready cleaning of the leg and the heat responsive unit, switch means on said base member and operated by said heat responsive unit for controlling said heating means, means for rendering said switch means inoperative when said heater is removed from said container to prevent accidental energizing of said heating means, said heat responsive unit including a tubular shell having a lower portion formed from material with a relatively high coefficient of expansion and an upper portion formed from material with a relatively low coefficient of expansion, and an elongated member freely disposed within said shell and operatively connected with the lower end thereof, said elongated member being formed from material with a relatively low coefficient of expansion so that the elongated member is raised and lowered in accordance with any contraction and expansion of the lower shell portion for controlling said switch means.

11. A unitary immersion heater including a base member adapted removably to rest on an upwardly facing edge of a container, heating means including an elongated tubular shield with a single leg portion secured to said base member and adapted to extend along a wall of said container and a generally spiral portion extending from a lower end of said leg portion for overlying the bottom of a container, an electrical resistance element doubled through said shield, thermostat means mounted on said base member and including an elongated tubular heat responsive unit extending generally along said leg and secured to said base member, which heat responsive unit is spaced from said leg sufficiently to permit ready cleaning thereof, switch means on said base member and operated by said heat responsive unit for controlling said heating means, and means for rendering said switch means inoperative when said heater is removed from the container to prevent accidental energizing of the heating means.

References Cited in the file of this patent

UNITED STATES PATENTS

| Number | Name | Date |
| --- | --- | --- |
| 671,139 | Leask | Apr. 2, 1901 |
| 1,912,921 | Spencer | June 6, 1933 |
| 1,994,909 | Ehrgott | Mar. 19, 1935 |
| 2,039,641 | Fichtner | May 5, 1936 |
| 2,471,260 | Chapman | May 24, 1949 |
| 2,576,688 | Landgraf | Nov. 27, 1951 |